Dec. 19, 1944.  S. M. UDALE  2,365,313
SPARK CONTROL
Filed Dec. 23, 1943  2 Sheets-Sheet 1

INVENTOR.

Dec. 19, 1944. S. M. UDALE 2,365,313
SPARK CONTROL
Filed Dec. 23, 1943 2 Sheets-Sheet 2
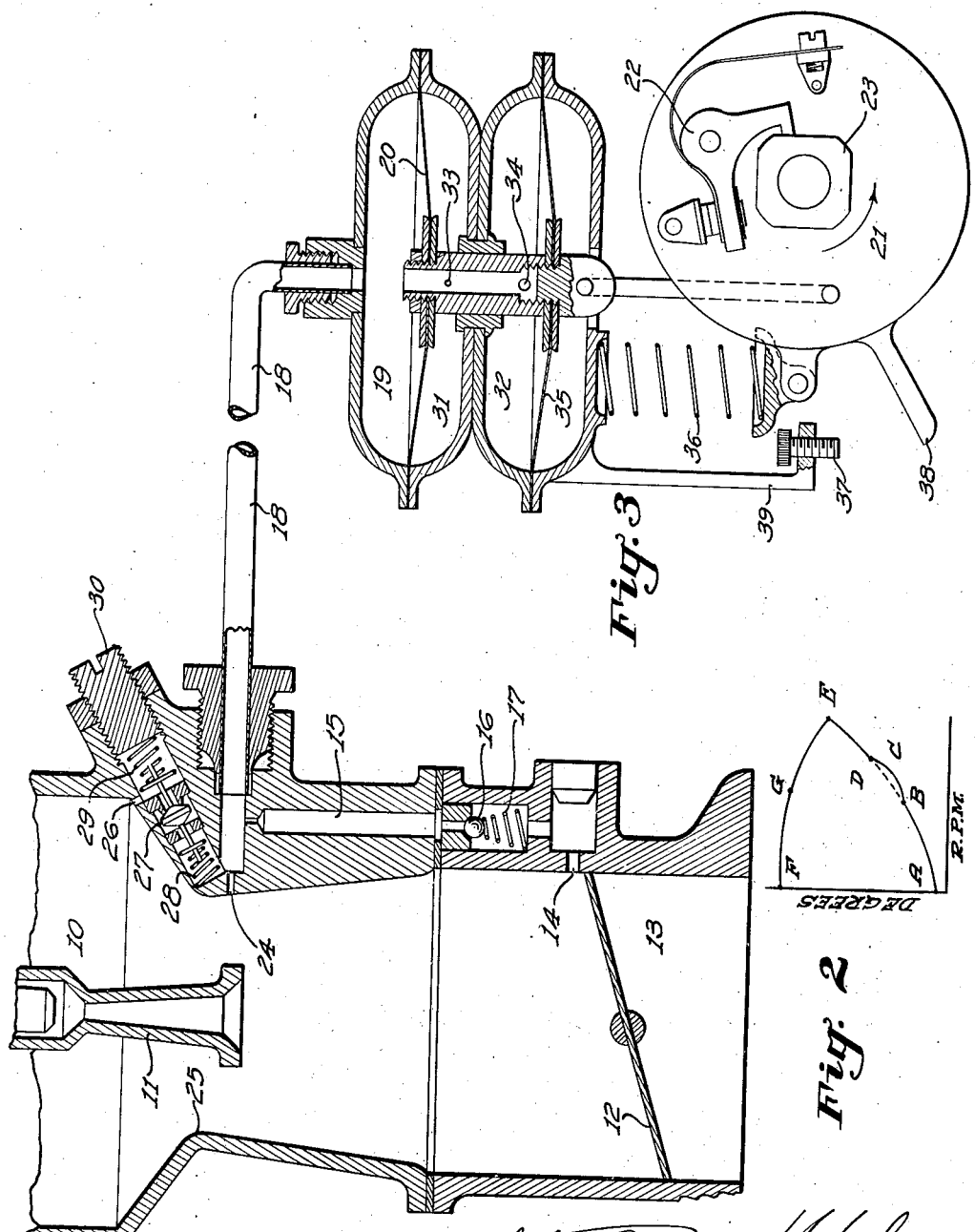
INVENTOR.

Patented Dec. 19, 1944

2,365,313

UNITED STATES PATENT OFFICE 2,365,313

SPARK CONTROL

Stanley M. Udale, Detroit, Mich., assignor to George M. Holley and Earl Holley

Application December 23, 1943, Serial No. 515,464

4 Claims. (Cl. 123—117)

The object of this invention is to utilize the suction in the venturi of a plain tube carburetor and also to utilize the suction in the inlet manifold on the engine side of a plain tube carburetor and to use the Venturi suction for advancing the spark at wide open throttle and to use the inlet manifold suction for advancing the spark at part throttle and to prevent excessive suction remaining in the mechanism during acceleration. It is highly desirable when the throttle is rapidly opened that the point of ignition should be even more rapidly retarded as the engine is extremely sensitive to an advanced spark during acceleration as the mixture tends to be lean. It is now well known that lean mixtures tend to knock more than rich mixtures.

Another object of this invention is to provide means for removing a knock that occurs at some specific engine speed, for example, at wide open throttle, or rather to remove a knock that occurs between relatively narrow limits, for example, a knock which does not make itself heard until the engine exceeds 1,500 R. P. M. and which fades out rapidly as the speed approaches 2,500 R. P. M. Obviously, if the spark could be retarded at about 2,000 R. P. M. there would not be any great objection to a slight knock at 1,500 R. P. M. and at 2,500 R. P. M., but a spark which causes a knock at any speed between 1,500 R. P. M. and 2,500 R. P. M. will be objectionable.

Public tolerance of engines that knock can not be relied upon and the danger is that the public will demand that the spark be retarded at all speeds and under all conditions and then not only is the power adversely affected, but a serious loss of fuel mileage results. There are also the factors of over-heating the exhaust valves, pistons, exhaust pipe, and spark plugs so that it is highly desirable that the spark occur as early as possible with any given fuel and with any given compression ratio.

Fig. 2 is a diagram illustrating the functions of the mechanism illustrated in Fig. 1.

Fig. 3 shows the means for minimizing the intensity of the "acceleration knock."

Figure 1:
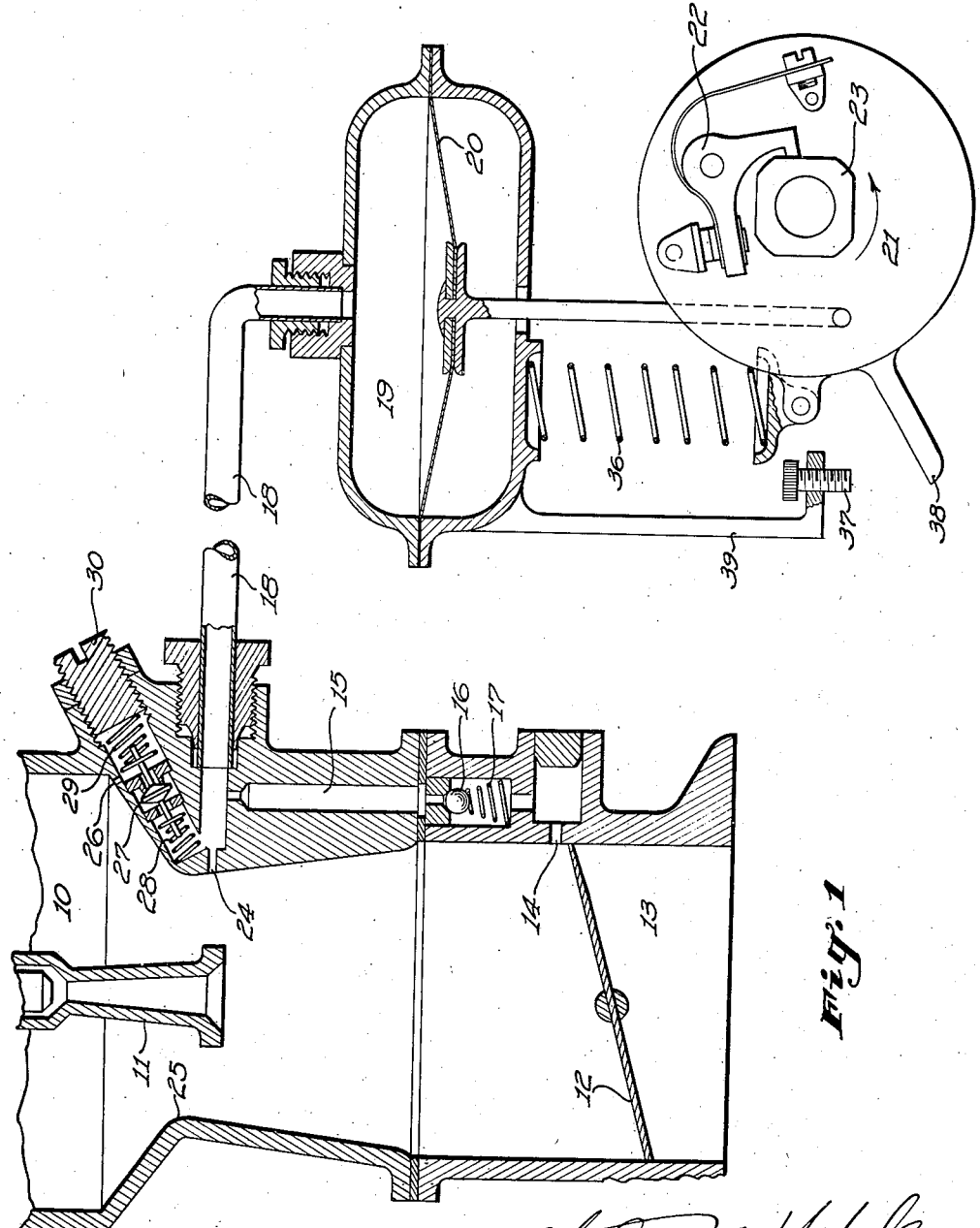
Fig. 1 shows the form of my invention adapted to remove the spark knock at some specific speed.

In Fig. 1, 10 is the air entrance. 11 is a fuel nozzle discharging therein. 12 is the throttle. 13 is a mixture outlet. 14 is a relatively unrestricted opening and acts as the part throttle spark advance connection. 15 is a passage controlled by a check valve 16 supported by a spring 17. 18 is a pipe connected to a chamber 19 the lower wall of which is formed by a flexible diaphragm 20 connected through a rod 37 to a circuit breaker 21 incorporating the usual breaker arm 22 and cam 23. 24 is the restricted high-speed orifice in the throat of the venturi 25. 26 is a restricted air vent into the air entrance 10 controlled by a check valve 27 which is controlled by two springs 28 and 29. The spring 29 is adjusted by the threaded rod 30 to remove a spark knock which occurs at some specific R. P. M.

Fig. 2 shows the operation of the device illustrated in Fig. 1. The horizontal line indicates the revolutions per minute (R. P. M.) and the vertical line represents the degree of spark advance. When the throttle is wide open, the check valve 16 closes and the spark is controlled solely by the orifice 24. As the speed increases, the suction in pipe 18 causes the spark advance to increase along line AB until a speed of 1,500 R. P. M. is reached, at which speed the spring 28 is too weak to keep the valve 27 on its upper seat and the unseating of the valve 27 causes the spark advance to remain constant at point B until 2,500 R. P. M. is reached, at which speed the ball check 27 seats on its lower seat because the spring 28 cannot prevent the valve seating. Thereupon the suction immediately increases and the spark jumps to the point D and continues along line DE which is a continuation of the line AB. AE is the normal spark advance curve in universal use. BCD is a detour to take care of either a fuel or engine idiosyncrasy characteristic of the engine to which this ignition device is applied, which engine we assume has shown a tendency to knock between 1,500 R. P. M. and 2,500 R. P. M. so that by suitably arranging the springs 29 and 29 and the adjusting screw 30 it is possible to minimize this objectionable feature.

The throttle 12, when partly open, causes a high suction at the opening 14 which unseats the ball check valve 16 and advances the spark from A to F in a well known manner. When the throttle 12 reaches a point where the suction in the manifold falls, the spark is retarded along the line GE in the usual manner.

Fig. 3 shows a modification adapted to eliminate knocking during acceleration. As before, 18 is the pipe connecting the diaphragm chamber 19 with the Venturi suction (restriction 24) and when the throttle is partly open, with the mixture outlet suction (opening 14). Additional chambers 31 and 32 have been added. The chamber 31 communicates with chamber 19 through the restricted opening 33. The chamber 32 communicates with chamber 19 through the unrestricted opening 34.

In order to limit the amount of spark advance at high vacuum in the mixture outlet, a projection 38 extends from the circuit breaker plate 21 and engages with an adjustable stop 37 on a bracket 39 so that the spark is advanced no more than a definite amount. Assuming that the diaphragm 20 is stretched to its maximum amount by the spring 36, there is no need for a minimum spark advance adjustment.

*Operation*

When the throttle is opened suddenly, the pressure in the pipe 18 increases rapidly. Therefore, the pressure in chambers 19 and 32 increases rapidly but the pressure in chamber 31 remains at sub-atmospheric pressure for a period of time determined by the size of the restricted opening 33 and the leakage between the hollow shaft and the guide walls. For that reason there is a definite suction which acts momentarily on the diaphragm 20 causing diaphragm 20 to be drawn down so as to assist spring 36 in retarding the spark advance mechanism 21, 22, and 23. Hence the strength of the spring 35 is augmented by the difference in pressure between the chambers 19 and 31. Therefore, the spark is retarded by a more powerful force than the spring 36 acting alone. The spark is thus retarded rapidly instead of gradually so that during acceleration there is a more prompt retardation of the spark than would otherwise occur.

The reason orifice 24 must be small is that when the throttle 12 is partly open, check valve 16 is unseated. The suction in the mixture outlet 13 must be effective on diaphragm 20 to advance the spark and to whatever extent orifice 24 admits air, to that extent the suction acting on diaphragm 20 is weakened. Hence the opening 14 is made larger than the opening 24 and because 24 is small in relation to 14, it takes an appreciable length of time during acceleration before atmospheric pressure is restored in chamber 19 and during this appreciable time interval the engine knocks.

During acceleration the valve 27 is first unseated and then reseated. During the interval of time that the valve 27 is moving from one seat to the other, the advance of the ignition is momentarily retarded.

During deceleration, excessive suctions are created in the mixture outlet 13 and the vacuum in chamber 19 is rapidly built up and the spark is rapidly advanced to the amount determined by the stop 37 engaging with the projection 38 which limits the advance of the spark. During deceleration, the valve 27 is rapidly unseated and reseated and plays practically no part at all, but during acceleration it does contribute to minimizing the knock usually associated with acceleration assuming that the spark adjustment 37 is set so as to give the highest possible fuel economy.

What I claim is:

1. In a circuit breaker for spark distributors for an internal combustion engine having a carburetor with a venturi in the air entrance and a throttle valve in the mixture outlet, said circuit breaker including a cam, a contact-carrying breaker arm, a relatively fixed contact, movable supporting means for said breaker arm and said relatively fixed contact, said means being adjustable angularly about said cam to advance or retard the spark, said mechanism comprising a pressure responsive diaphragm from which a connection is made to said adjustable supporting means, a conduit for applying suction on said diaphragm from the throat of the venturi from said carburetor, a restriction therein, a second conduit for applying suction on the suction side of said restriction from the discharge side of said throttle valve, a check valve in said second conduit opening towards the engine, a restriction in said second conduit, a second diaphragm, a chamber associated therewith, a restricted passage connecting said chamber with the suction in the mixture outlet, a third chamber associated with said diaphragm, said third chamber being in unrestricted communication with the suction in the mixture outlet, means for connecting first and second diaphragms together so that the movement of the first diaphragm is assisted momentarily during acceleration, spring means adapted to oppose one of said suction-operated diaphragms and to assist the other diaphragm in retarding the time of ignition.

2. In a circuit breaker for spark distributors for an internal combustion engine having a carburetor with a venturi in the air entrance and a throttle valve in the mixture outlet, said circuit breaker including a cam, a contact-carrying breaker arm and a relatively fixed contact, movable supporting means for said breaker arm and said relatively fixed contact, said means being adjustable angularly about said cam to advance or retard the spark, said mechanism comprising a pressure responsive diaphragm from which a connection is made to said adjustable supporting means, a conduit for applying suction on said diaphragm from the throat of the venturi of said carburetor, a restriction therein, and in which there is a second diaphragm forming a second chamber, said second chamber being in restricted communication with the suction in the mixture outlet, a second chamber associated with said second diaphragm, said second chamber being in unrestricted communication with the suction in the mixture outlet, means for connecting the two diaphragms together so that the movement of the first diaphragm is assisted during acceleration so as to rapidly retard the spark to prevent knocking during acceleration, spring means adapted to oppose one of said suction responsive diaphragms and to assist the other diaphragm, said spring means being adapted to retard the spark timing.

3. In a circuit breaker for spark distributors for internal combustion engines having a carburetor with a venturi in the air entrance and a throttle valve, said circuit breaker including a cam, a contact-carrying breaker arm and a relatively fixed contact, movable supporting means for said breaker arm and said relatively fixed contact, said means being adjustable angularly about said cam to advance or retard the spark, said mechanism comprising a pressure responsive diaphragm from which a connection is made to said adjustable supporting means, a conduit for applying suction on said diaphragm from the throat of the venturi of said carburetor, a restriction therein, a second conduit for applying suction from the discharge side of said throttle valve when in partly open position, a check valve in said conduit opening toward the engine forming a restriction in said conduit and in which there is a second check valve located in a third conduit, said third conduit communicating freely with the suction side of said first conduit, said second check valve being adapted to be unseated at a relatively low suction and to be reseated at a slightly higher suction, spring means for controlling said check valve, the value of the suction at which said second check valve is adapted to operate being relatively low as compared with the suction in the mixture outlet.

4. In a circuit breaker for spark distributors for internal combustion engines having a carburetor with a venturi in the air entrance and a throttle valve in the mixture outlet, said circuit breaker including a cam, a contact-carrying breaker arm and a relatively fixed contact, movable supporting means for said breaker arm and said relatively fixed contact, said means being adjustable angularly about said cam to advance or retard the spark, said mechanism comprising a pressure responsive diaphragm from which a connection is made to said adjustable supporting means, a conduit for applying suction on said diaphragm from the throat of the venturi of said carburetor, a restriction therein, a second conduit for applying suction from the discharge side of said throttle valve when in partly open position, a restriction in said second conduit, and in which there is a check valve located in a third conduit, said third conduit communicating freely with the suction side of said first conduit, said check valve being adapted to be unseated at a relatively low suction and to be reseated at a slightly higher suction, spring means for controlling said check valve, the value of the suction at which said check valve is adapted to operate being relatively low as compared with the suction in the mixture outlet.

STANLEY M. UDALE.